US011213023B2

(12) United States Patent
Cao et al.

(10) Patent No.: US 11,213,023 B2
(45) Date of Patent: Jan. 4, 2022

(54) VOLATILE MATERIAL DISPENSING SYSTEM

(71) Applicant: S. C. Johnson & Son, Inc., Racine, WI (US)

(72) Inventors: Hai Yan Cao, Shanghai (CN); Amos Chen, Shanghai (CN); Shumao Han, Shanghai (CN); Joanna Jia, Shanghai (CN); Salvador Munoz, Grayslake, IL (US); Deliang Shi, Kenosha, WI (US)

(73) Assignee: S. C. Johnson & Son, Inc., Racine, WI (US)

( * ) Notice: Subject to any disclaimer, the term of this patent is extended or adjusted under 35 U.S.C. 154(b) by 508 days.

(21) Appl. No.: 14/416,806

(22) PCT Filed: Jul. 24, 2013

(86) PCT No.: PCT/US2013/051778
§ 371 (c)(1),
(2) Date: Jan. 23, 2015

(87) PCT Pub. No.: WO2014/018597
PCT Pub. Date: Jan. 30, 2014

(65) Prior Publication Data
US 2015/0201604 A1     Jul. 23, 2015

Related U.S. Application Data

(60) Provisional application No. 61/675,204, filed on Jul. 24, 2012.

(51) Int. Cl.
*A01M 1/20* (2006.01)
*B23P 19/04* (2006.01)

(52) U.S. Cl.
CPC ........ *A01M 1/2027* (2013.01); *A01M 1/2055* (2013.01); *B23P 19/04* (2013.01); *Y10T 29/49815* (2015.01); *Y10T 29/49822* (2015.01)

(58) Field of Classification Search
CPC .......... A45C 13/00; A45C 13/02; A01M 1/20; A01M 1/2022; A01M 1/02; A01M 1/106;
(Continued)

(56) References Cited

U.S. PATENT DOCUMENTS 1,662,738 A * 3/1928 Coogle ............... A01M 1/2055
239/57
2,086,046 A * 7/1937 Preston ............... A01M 1/2055
424/84

(Continued)

FOREIGN PATENT DOCUMENTS

AU     2007279075 A1    1/2008
DE     103 61 048 A1    7/2004
(Continued)

OTHER PUBLICATIONS

"remove." Merriam-Webster.com. 2018. https://www.merriam-webster.com/dictionary/remove (Aug. 8, 2018).*

(Continued)

*Primary Examiner* — Alex M Valvis
*Assistant Examiner* — Christopher R Dandridge
(74) *Attorney, Agent, or Firm* — Quarles & Brady LLP

(57) ABSTRACT

A volatile material dispensing system (100) includes a base (104) and a refill (102) attached to the base (104). The refill (102) includes a substrate (108) having a volatile material thereon. The dispensing system (100) further includes a cover (106). In an inactive state, the refill (102) is compressed within the cover (106) and the cover (106) is attached to the base (104) and in an active state, the cover (106) is removed from the base and the refill (102) automatically expands such that the volatile material is released from the substrate (108) and into the ambient environment.

21 Claims, 12 Drawing Sheets

(58) Field of Classification Search
CPC .............. A01M 1/2044; A01M 1/2027; A01M 1/2055; B23P 19/04; Y10T 29/49815; Y10T 29/49822
See application file for complete search history.

(56) References Cited

U.S. PATENT DOCUMENTS

| | | | | |
|---|---|---|---|---|
| 2,537,357 | A * | 1/1951 | Levin | A01M 1/2044 239/47 |
| 3,014,516 | A * | 12/1961 | Mueller | B65D 37/00 220/9.2 |
| 3,730,434 | A * | 5/1973 | Engel | A01M 1/2055 239/47 |
| 4,103,450 | A * | 8/1978 | Whitcomb | A01M 1/2016 428/907 |
| 4,802,626 | A | 2/1989 | Forbes et al. | |
| 5,746,019 | A * | 5/1998 | Fisher | A01M 31/008 239/145 |
| 5,960,983 | A * | 10/1999 | Chan | B65F 1/02 220/489 |
| 6,119,958 | A * | 9/2000 | De Vecchi | A61L 9/12 239/55 |
| D434,890 | S | 12/2000 | Cooper | |
| 6,360,447 | B1 | 3/2002 | Foley | |
| 6,440,438 | B2 * | 8/2002 | Platts | A01K 1/0353 424/403 |
| D470,910 | S | 2/2003 | Abel | |
| 6,520,365 | B2 | 2/2003 | Schneider | |
| 6,554,149 | B2 * | 4/2003 | Schneider | A45C 7/0077 220/666 |
| 6,612,453 | B2 * | 9/2003 | Joo-Tai | A45C 7/0077 220/9.2 |
| 6,616,004 | B1 | 9/2003 | Erickson et al. | |
| 6,631,891 | B1 | 10/2003 | Slade | |
| 6,736,285 | B2 | 5/2004 | Stewart-Stand | |
| 6,913,733 | B2 | 7/2005 | Hardy et al. | |
| 7,051,949 | B2 | 5/2006 | Aiyama | |
| 7,344,729 | B2 | 3/2008 | Kemmis et al. | |
| 7,360,671 | B2 | 4/2008 | Slade | |
| D590,950 | S | 4/2009 | Driver et al. | |
| 7,624,874 | B2 * | 12/2009 | Douglas | B65F 1/06 206/581 |
| D622,466 | S | 8/2010 | Sabounjian | |
| D623,948 | S | 9/2010 | Levy | |
| 7,815,372 | B2 * | 10/2010 | Stanton | B65F 1/1415 383/104 |
| 7,892,487 | B2 | 2/2011 | Adair et al. | |
| D646,934 | S | 10/2011 | Peters et al. | |
| 8,070,006 | B2 | 12/2011 | Austin et al. | |
| 8,091,741 | B2 | 1/2012 | Pritchard | |
| 8,485,209 | B2 * | 7/2013 | Imhof | E04H 15/54 135/126 |
| 2003/0183630 | A1 * | 10/2003 | Schneider | A45C 7/0077 220/9.2 |
| 2003/0199421 | A1 | 10/2003 | Copfer | |
| 2005/0284866 | A1 | 12/2005 | Oakner et al. | |
| 2007/0141097 | A1 * | 6/2007 | Balakrishnan | A01M 1/2055 424/405 |
| 2008/0265053 | A1 | 10/2008 | Guzman | |
| 2010/0186792 | A1 | 7/2010 | Imhof | |
| 2010/0236709 | A1 | 9/2010 | Mutch | |
| 2011/0198808 | A1 | 8/2011 | Fischer et al. | |

FOREIGN PATENT DOCUMENTS

| | | | |
|---|---|---|---|
| EP | 1328464 B1 | 2/2007 | |
| EP | 1 790 221 A1 | 5/2007 | |
| GB | 2 407 771 A | 5/2005 | |
| GB | 240771 | * 11/2005 | .............. A01N 25/18 |
| GB | 2407771 | * 11/2005 | .............. A01N 25/18 |
| JP | 4182512 B2 | 11/2008 | |
| WO | 2008/012507 A1 | 1/2008 | |
| WO | 2008012507 A1 | 1/2008 | |
| WO | WO 2012/032310 A1 | 3/2012 | |

OTHER PUBLICATIONS

International Search Report and Written Opinion of the International Searching Authority issued in PCT/US2013/051778, dated Mar. 5, 2014 (13 pages).

Office Action issued in corresponding Mexican Patent Application No. MX/a/2015/001132, dated Apr. 19, 2018, 4 pages.

Communication pursuant to Article 94(3) EPC issued in corresponding European Application No. 13745295.9, dated Oct. 12, 2018, 10 pages.

* cited by examiner

VOLATILE MATERIAL DISPENSING SYSTEM

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Background

The present invention generally relates to a volatile material dispensing system, and more particularly, to a passive volatile material dispensing system that may be prevented from dispensing a volatile material when not in use.

2. Description of the Background

Various volatile material dispensing systems have been used to provide volatiles to an environment. Many of these dispensing systems generally include a reservoir that holds the volatile material and a housing or structure for retaining the reservoir. Typically, prior art dispensing systems either allow passive diffusion of the volatile material to occur or enhance and/or facilitate diffusion through the active release of the volatile material with the assistance of a dispensing mechanism. Typical dispensing mechanisms used in volatile material dispensing systems include electromechanical drive units, heating apparatuses, and/or fans.

Many passive dispensing systems in the prior art utilize a reservoir having a semi-permeable membrane disposed thereover and a volatile material disposed therein. Prior to use a user removes an impermeable membrane disposed over the semi-permeable membrane to allow the volatile to be continuously evaporated from the reservoir. In a different prior art diffusion device, a substantially flat substrate includes a volatile material disposed thereon that is slowly released into the surrounding environment.

One drawback of such prior art dispensing systems is that once the reservoir containing the volatile is opened the volatile will be continuously emitted into an environment until the reservoir is empty. Thus, the prior art dispensing systems continuously emit the volatile even when it is not needed or desired. The constant release of volatile material, even when the release of the volatile material is not desired, shortens the useful life span of the dispensing system.

Active dispensing systems have been designed to control the release of the volatile material. However, these active systems often comprise many parts, making them difficult to manufacture or use. Further, these active systems require a power source in order to release the material.

Alternatively, other dispensing systems use a flame to heat and release the volatile material. However, many users do not desire to leave such dispensing systems unattended and do not set and walk away from such dispensing systems.

Therefore, it is desirable to have a dispensing system that releases a volatile material without the aid of a heating apparatus, fan, or other mechanical elements and that is easier to manufacture and use. Further, it is desirable to have a passive dispensing system that is capable of being "turned off" such that the volatile material is prevented from being dispersed into an environment when the device is not in use, thereby extending the useful life span of the dispensing system.

SUMMARY OF THE INVENTION

In one embodiment, refill for a volatile material dispensing system includes a helical spring and a substrate disposed around the spring. The substrate is a semi-permeable material designed to carry a volatile material thereon.

In a different embodiment, a volatile material dispensing system includes a base and a refill attached to the base. The refill includes a substrate having a volatile material thereon. The dispensing system further includes a cover. In an inactive state, the refill is compressed within the cover and the cover is attached to the base and in an active state, the cover is removed from the base and the refill automatically expands such that the volatile material is released from the substrate and into the ambient environment.

In a further embodiment, a method of placing a volatile material dispensing system into an operative position includes the step of providing a refill within a cover and a base. The refill includes a substrate disposed around a compressed spring. The method further includes the step of removing the cover from the base, whereby the compressed spring expands to automatically place the refill in an operable position, such that air passes through and around the substrate.

In a still further embodiment, a collapsible passive dispensing system includes a refill. The refill includes a substrate having a volatile material disposed thereon. The dispensing system is capable of alternating between a first active state and a second inactive state. In the first active state air is permitted to pass through the substrate to release the volatile material and in the second inactive state air is prevented from passing through the substrate.

BRIEF DESCRIPTION OF THE DRAWINGS

Other aspects and advantages of the present invention will become apparent upon reading the following detailed description and upon reference to the drawings in which.

DETAILED DESCRIPTION OF THE INVENTION

Figure 1:
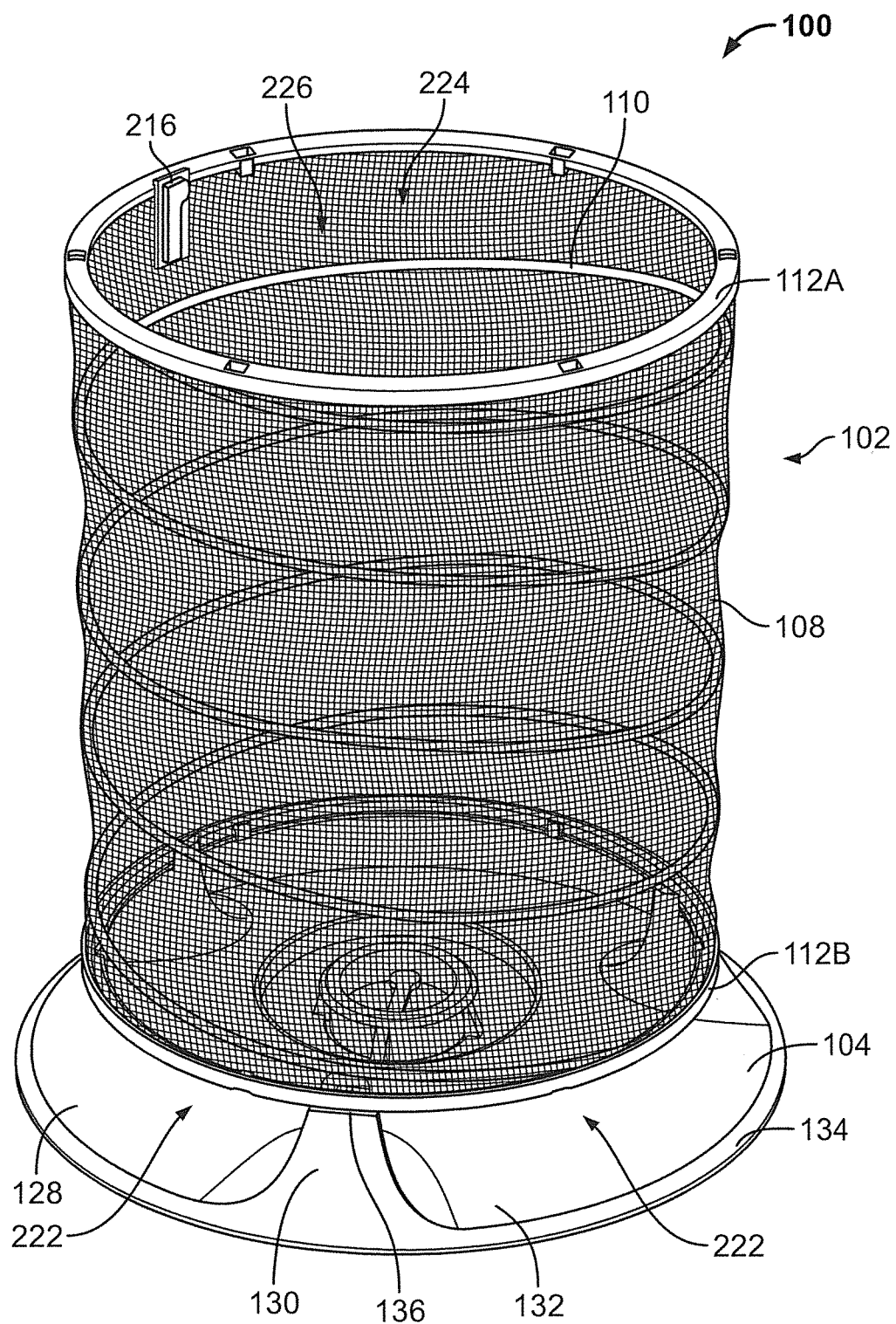
FIG. 1 is a front isometric view of a dispensing system in a first state that includes a base and a refill, wherein a cover has been omitted for purposes of clarity.
Figure 2:
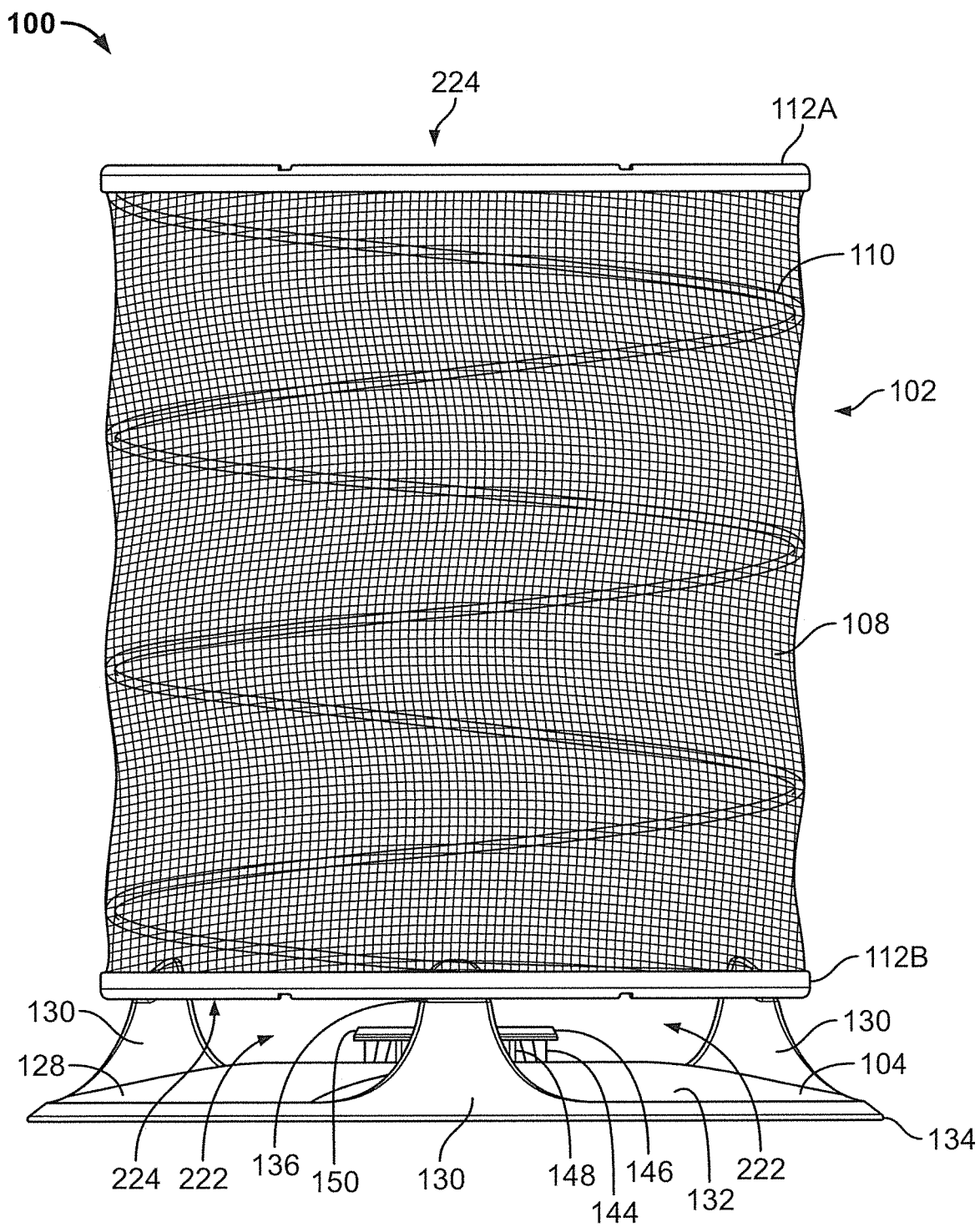
FIG. 2 is a front elevational view of the dispensing system of FIG. 1.
Figure 3:
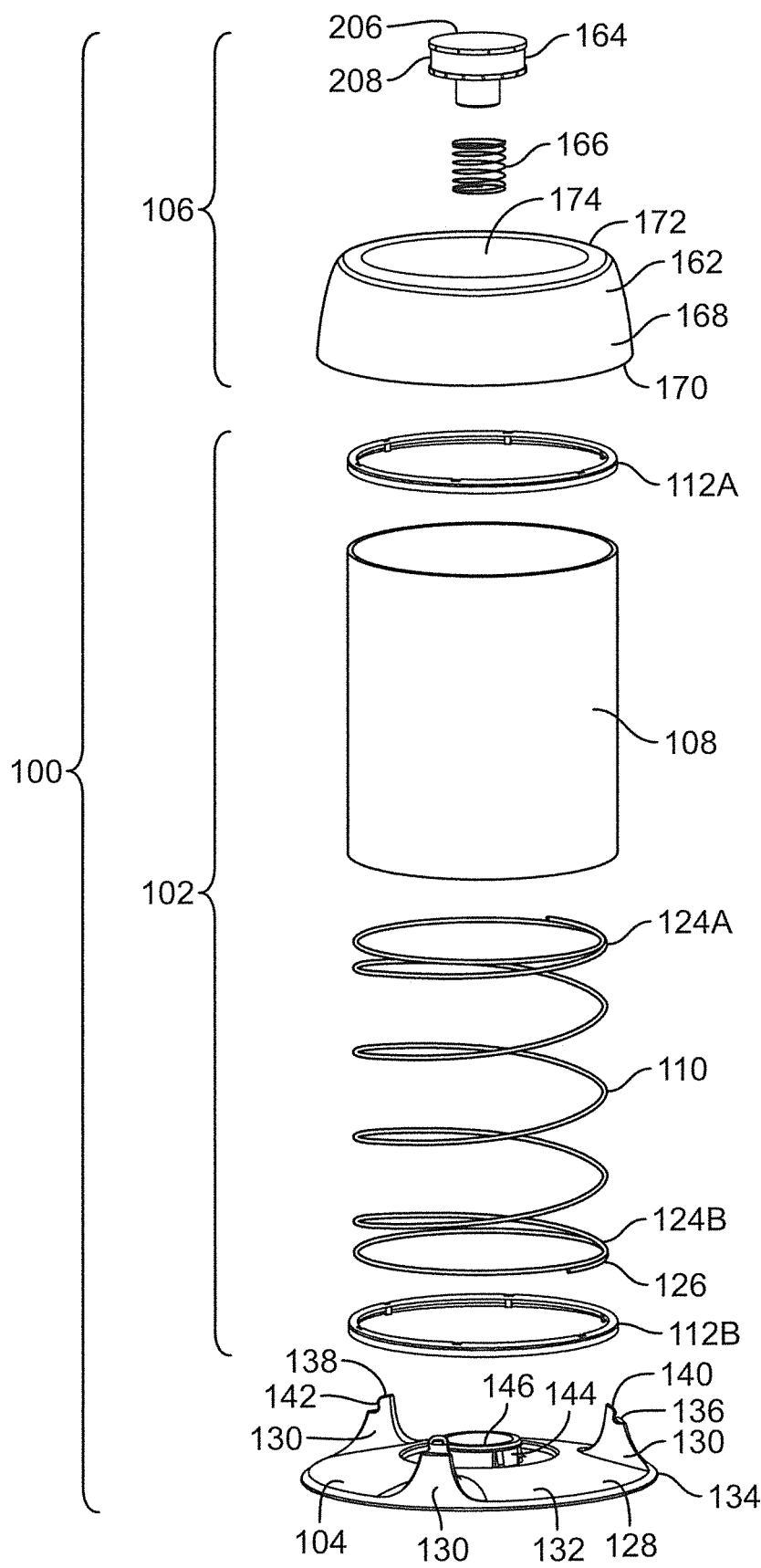
FIG. 3 is an exploded isometric view of the dispensing system of FIG. 1.

Referring to FIGS. 1-3, a volatile material dispensing system 100 is illustrated. The dispensing system 100 includes a volatile material dispensing refill 102, a base 104, and a cover 106. The dispensing system 100 is moveable between a first open state (shown in FIG. 1) where the dispensing system 100 releases a volatile material into the environment and a second closed state (see FIG. 11E), in which the cover 106 is attached and the volatile material is prevented from being emitted from the dispensing system 100.

Still referring to FIGS. 1-3, the refill 102 generally includes a substrate 108, a spring 110, and top and bottom annular support clips 112A, B. The substrate 108 is designed to carry the volatile material thereon. In a preferred embodiment, the substrate 108 comprises a semi-permeable barrier defined by a plurality of connected strands (not shown). The connected strands are preferably flexible and are criss-crossed to form a mesh web pattern and allow selective diffusion therethrough. The semi-permeable material allows air to pass between the connected strands to enhance dispersal of the volatile material. In one embodiment, the substrate 108 comprises a single element, however, the substrate 108 may comprise multiple sheets that are held together to form the refill 102.

By coating the substrate 108 with an appropriate volatile material, air entering the dispensing system 100 will acquire a portion of the volatile material, and dispense it from the dispensing system 100. Active release rates of at least 0.05 milligrams per hour (mg/hr) or higher are preferred. Suitable actives are D-teflumethrin, transfluthrin, prallethrin, vaporthrin, tefluthrin, and esbiothrin or other synthetic pyrethroids. The volatile material may solely comprise an active, or for ease of handling the material may be dissolved in a hydrocarbon, alcohol, or other solvent. Alternatively, or in addition, the substrate 108 may also bear a fragrance, a deodorizer, or other air treatment chemical.

The substrate 108 is preferably capable of holding a dose of the active ingredient in a relatively even distribution thereon and also capable of allowing evaporation in response to airflow. For an active ingredient that is hydrophobic and migrateable at common environmental temperatures between about 10° C. and 40° C. (e.g., D-teflumethrin), a suitable material includes, by way of example, nylon. The nylon may be characterized as having a basis weight ranging from 30 grams per square meter (gsm) to 150 grams per square meter (gsm) and may be fabricated from synthetic, natural, or combined synthetic and natural polymeric materials. In one preferred embodiment, the nylon is characterized by a thickness of between about 0.1 mm to about 0.8 mm, more preferably about 0.2 mm to about 0.5 mm, and most preferably about 0.35 mm. The nylon is further characterized by a melting point of about 150° C. to about 275° C., or about 200° C. to about 250° C., or about 215° C. to about 225° C. The nylon has a mesh size of between about 5 strands per cm to about 400 strands per cm. In one embodiment, the nylon has a mesh size of between about 15 strands per cm to about 80 strands per cm.

The substrate 108 should also allow for wicking of the active ingredient following dosing to ensure efficient distribution throughout the substrate 108. Dosing may be accomplished by dropping, spraying, printing, or other conventional delivery of a liquid active ingredient to the substrate 108. In one embodiment, the substrate 108 may be divided into a plurality of blocks for applying the active thereto. In such a division, the active ingredient on each square centimeter comprises about 0.1 mg.

Figure 4:
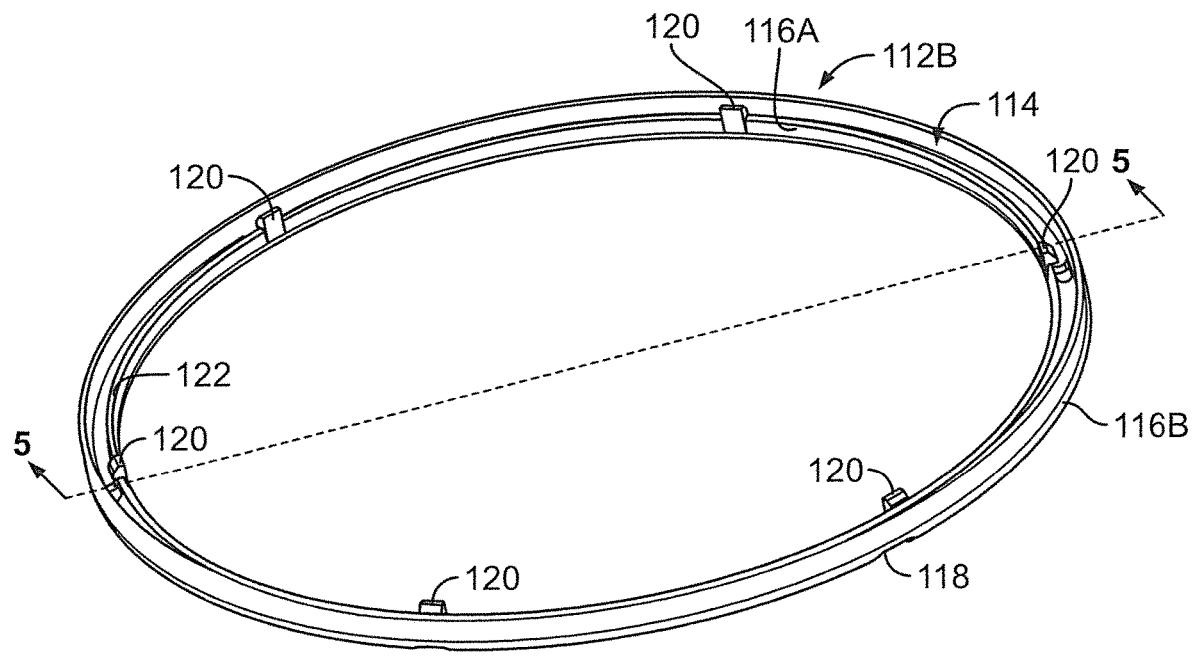
FIG. 4 is an isometric view of an annular support clip of the refill.
Figure 5:
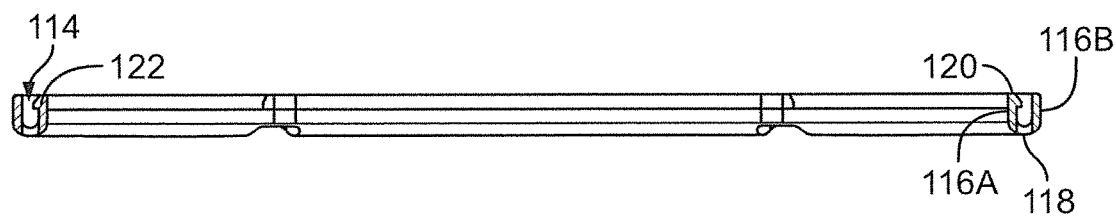
FIG. 5 is a cross-sectional view of the support clip of FIG. 4 taken along the line 5-5.

Turning to FIGS. 4 and 5, the bottom annular support clip 112B, is illustrated, which is identical to the top annular support clip 112A. The bottom annular support clip 112B includes an interior trough 114 defined by inner and outer sidewalls 116A, B, respectively, which are connected by a bottom sidewall 118. The bottom annular support clip 112B further includes a plurality of pawls 120 extending from an upper surface 122 of the inner sidewall 116A over a portion of the trough 114.

With reference to FIGS. 1-3 again, the refill 102 is assembled by wrapping the substrate 108 around an outer perimeter of the spring 110. A bottom end 124B of the spring 110 is then aligned and inserted into the trough 114 of the bottom annular support clip 112B. As the bottom end 124B of the spring 110 is inserted into the trough 114, the pawls 120 snap over a bottom coil 126 of the spring 110, thereby locking the substrate 108 and the spring 110 to the bottom annular support clip 112B. A top end 124A of the spring 110 is thereafter inserted and retained within the top annular support clip 112A in the same manner. Having identical top and bottom annular support clips 112A, B is beneficial because it prevents a user from incorrectly attaching the refill 102 to the base 104. Further, the top and bottom annular support clips 112A, B allow the user to handle the refill 102 without contacting the substrate 108 or the volatile material disposed thereon.

Figure 6A:
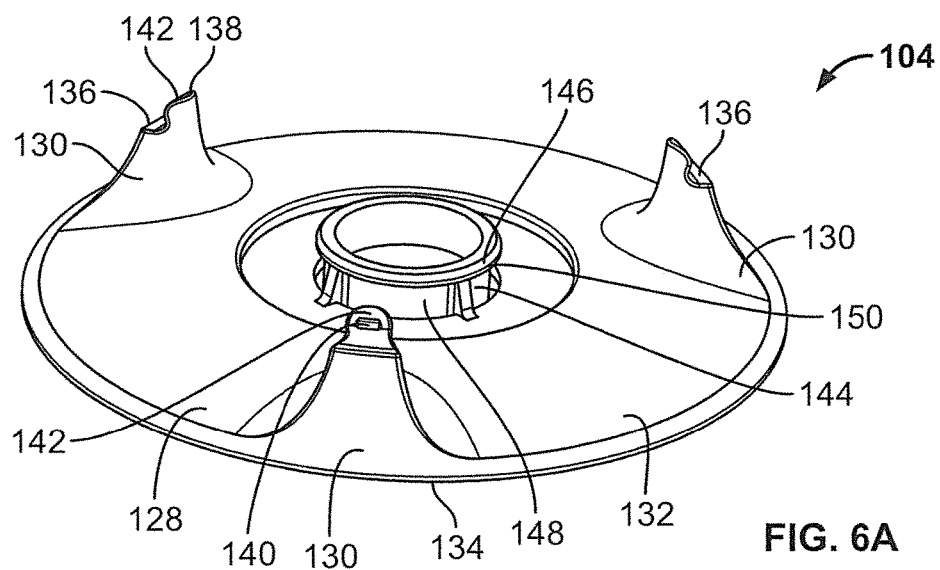
FIG. 6A is an isometric view of a front, top, and side of the base.
Figure 6B:
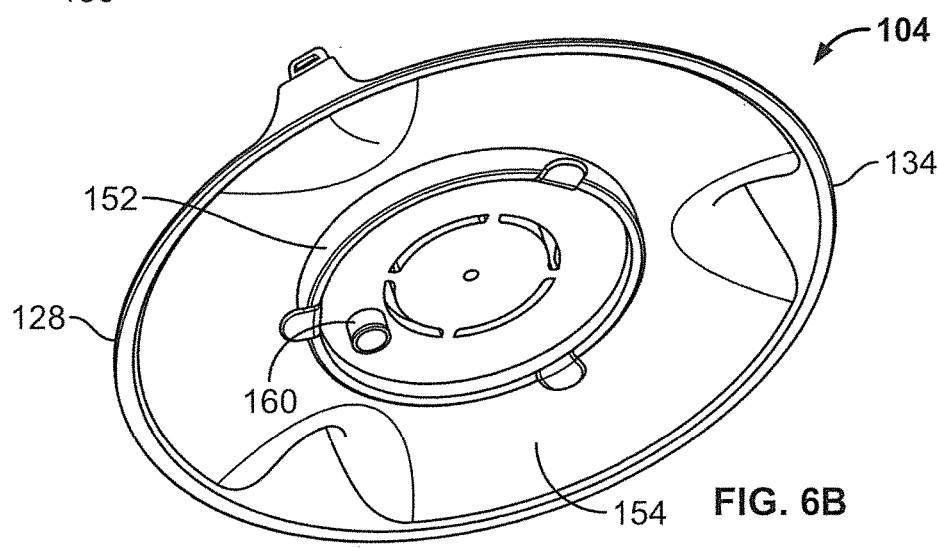
FIG. 6B is an isometric view of the bottom, front, and side of the base.
Figure 6C:
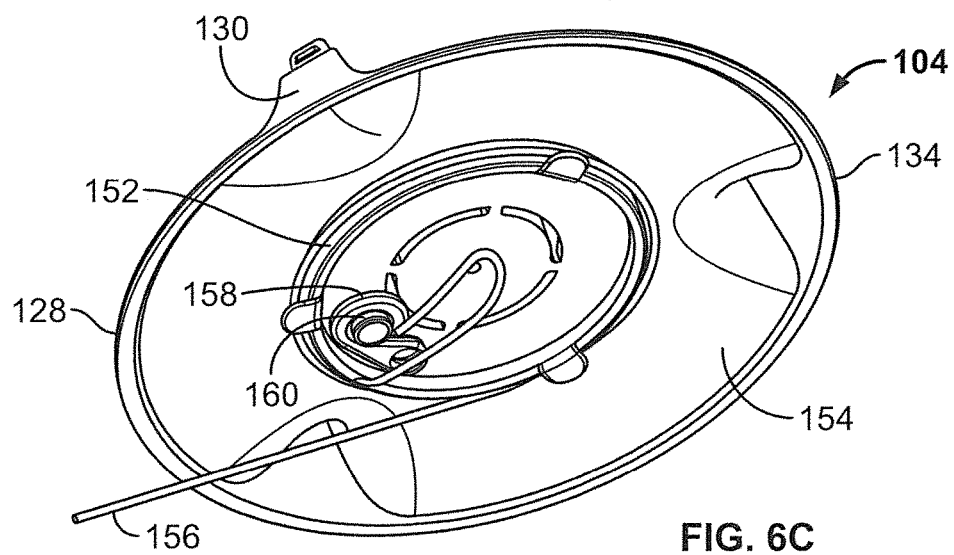
FIG. 6C is an isometric view of the base of FIG. 6B further showing a string and a hook.

Turning now to FIGS. 6A-C, the base 104 is shown to generally include a disc 128 with a plurality of arms 130 extending from a top surface 132 of the disc 128 near an outer edge 134 thereof. The arms 130 include retaining surfaces 136 adjacent distal portions 138 thereof. Pawls 140 and leader guide surfaces 142 are disposed on the distal ends 138 of the arms 130 above the retaining surfaces 136. An annular wall 144 extends upwardly from a central portion of the top surface 132 of the disc 128 and includes an annular ledge 146 extending outwardly from an exterior surface 148 thereof. The annular ledge 146 includes a guide surface 150 and is designed to interact with the cover 106 as described below.

Figure 7:
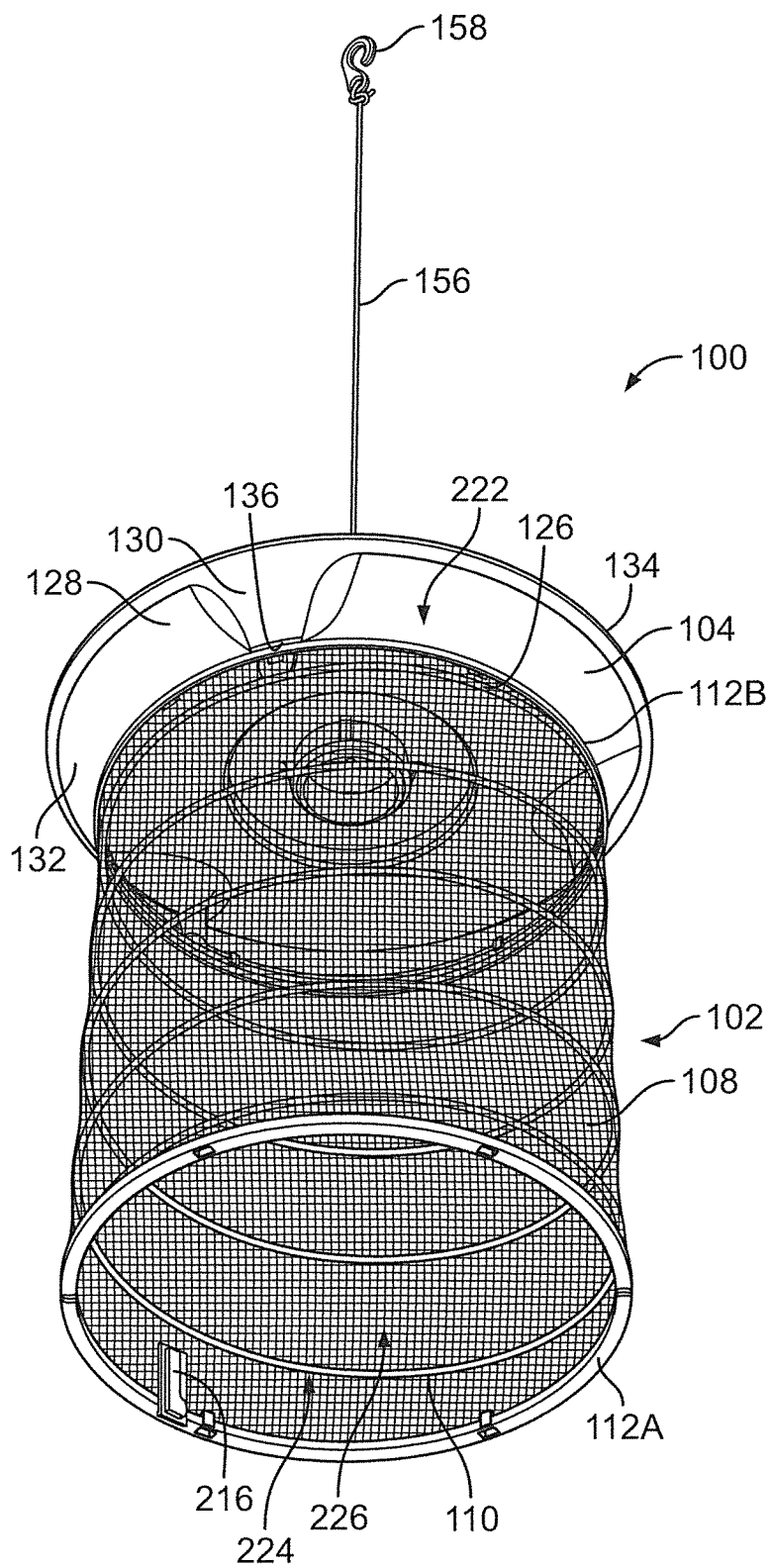
FIG. 7 is an isometric view of the dispenser of FIG. 1 shown in a hanging position.
Figure 8:
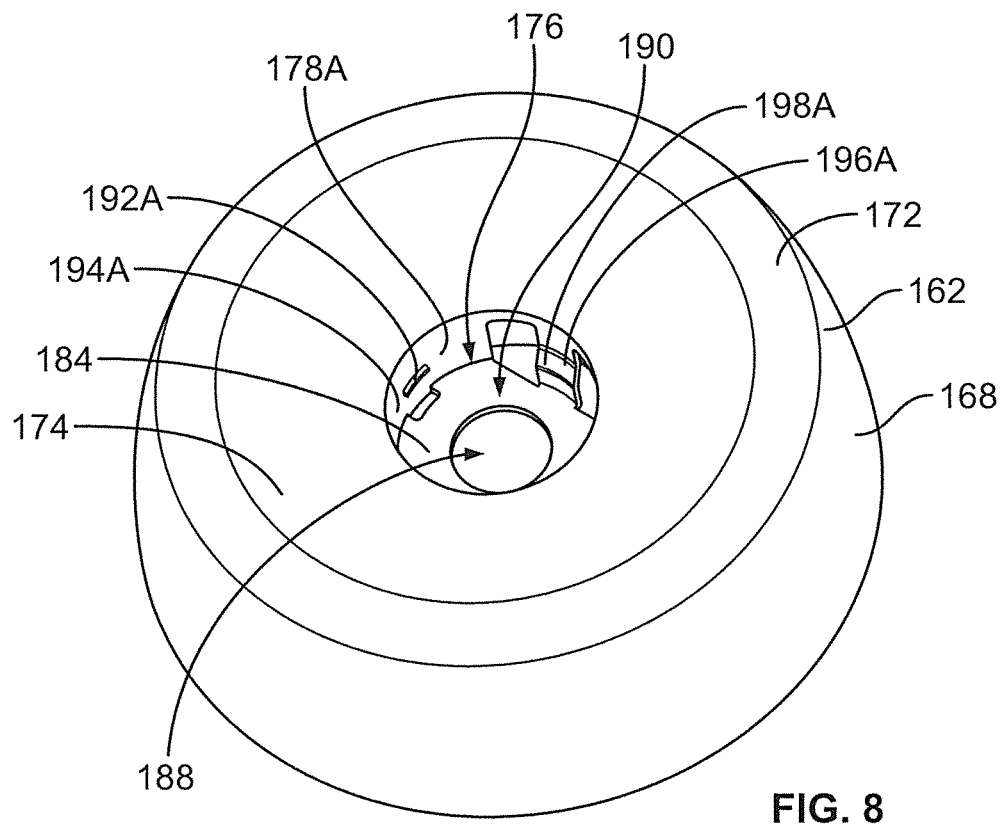
FIG. 8 is an isometric view of a top, front, and side of a body of the cover.

As shown in FIG. 6C, the base 104 further includes a cylindrical spool 152 extending from an underside 154 of the disc 128. A string 156 and hook 158 may be attached to the underside 154 of the disc 128 such that a user may hang the dispensing system 100 as shown in FIG. 7. When the string 156 is not being used, it is wrapped around the spool 152 and the hook 158 is latched on to a tab 160, thereby retaining the string 156 and hook 158 within the base 104.

Figure 9:
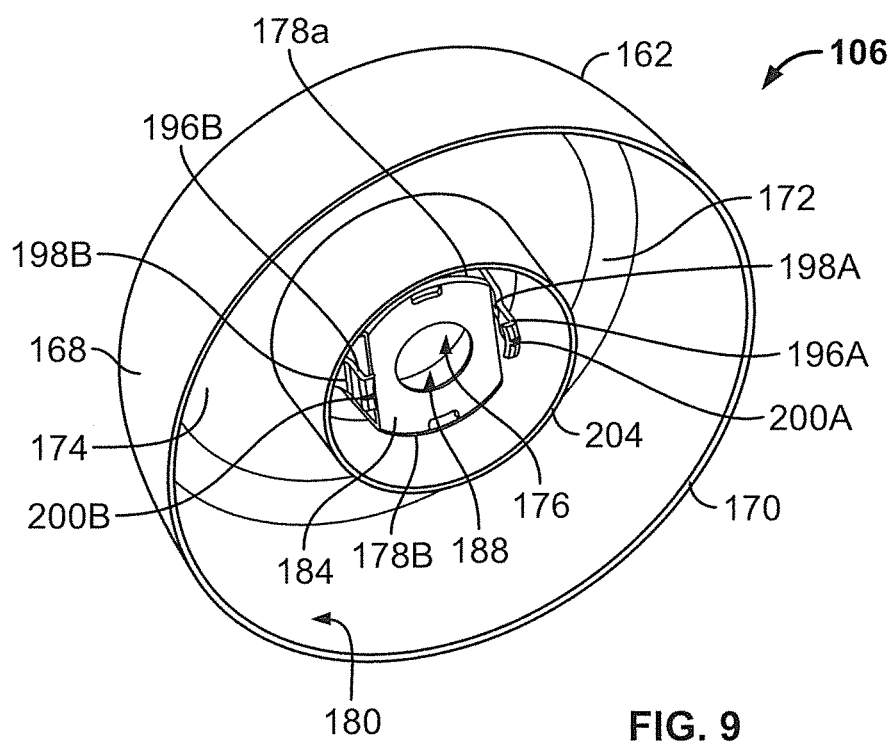
FIG. 9 is an isometric view of a bottom, front, and side of the cover of FIG. 8.

Referring now to FIGS. 8-10C, the cover 106 generally includes a body 162, a button 164, and a spring 166. The body 162 has an annular sidewall 168 extending from a lower end 170 to an upper convex wall 172, which transitions to a concave top wall 174. A bore 176 is disposed in the concave top wall 174. Two arc-shaped walls 178A, B depend from the concave top wall 174 into an interior 180 of the body 162 around opposing sides of a perimeter of the central bore 176. A shelf 184 extends between and connects lower ends of the two arc-shaped walls 178A, B and has a centrally located bore 188 disposed therein. The arc-shaped walls 178A, B and the shelf 184 create a seat 190 for receiving the button 164. The arc-shaped walls 178A, B also include tabs 192A, B extending from inner surfaces 194A, B thereof (see FIG. 12B). Turning to FIG. 9, the body 162 further includes two opposing arms 196A, B depending from the top wall 174 around the perimeter of the bore 176 between the arc-shaped walls 178A, B. The depending arms 196A, B angle inwardly to form shelf portions 198A, B before extending toward pawls 200A, B located on distal ends of the arms 196A, B. Further, an annular wall 204 depends from the top wall 174 into the interior 180 of the body 162 and surrounds the arc-shaped walls 178A, B, the shelf 184, and the arms 196A, B.

Figure 10A:
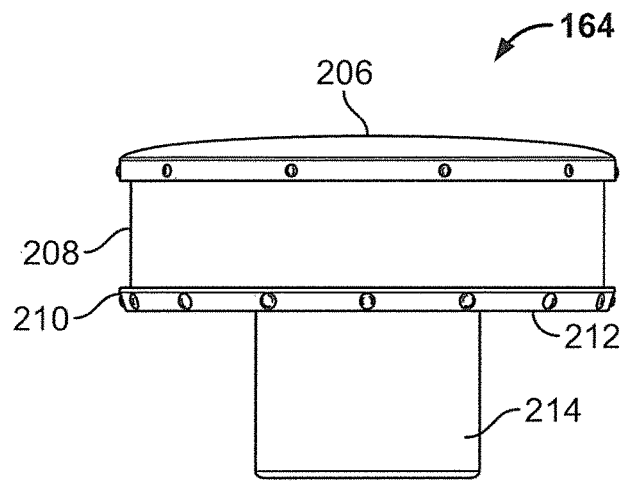
FIG. 10A is a front elevational view of a button of the cover.
Figure 10B:
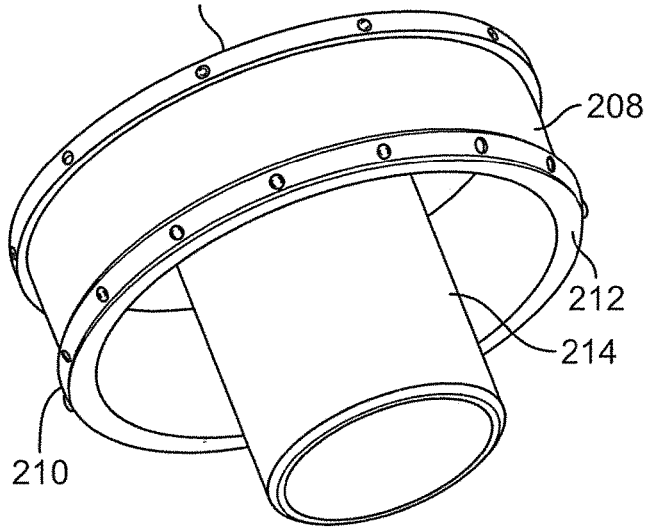
FIG. 10B is an isometric view of the bottom, front, and side of the button of FIG. 10A.
Figure 10C:
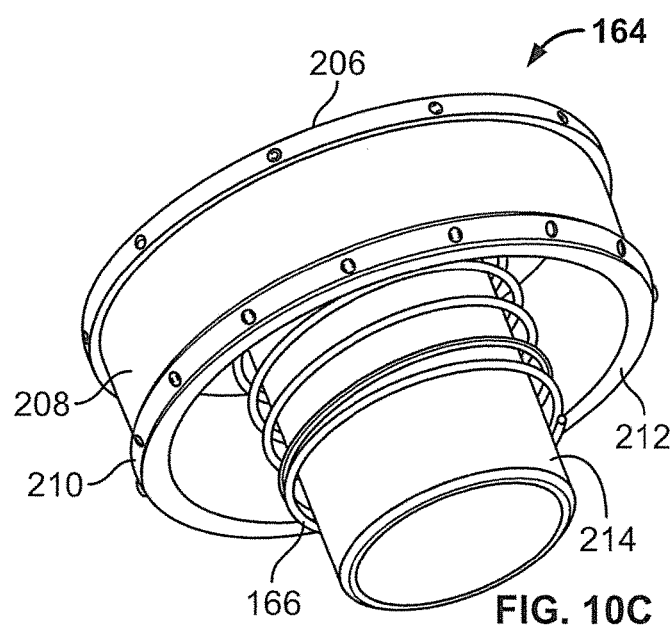
FIG. 10C is an isometric view of the button of FIGS. 10A and 10B further including a spring.

The button 164 is illustrated with particularity in FIGS. 10A-C. The button 164 includes a top wall 206 and an annular sidewall 208 depending therefrom. The sidewall 208 includes a ledge 210 extending around an exterior of a lower end 212 thereof. The button 164 further includes a cylindrical member 214 depending from the top wall 206 within the annular sidewall 208. The cylindrical member 214 is designed to receive and guide the spring 166 when the cover 106 is assembled.

In an assembled position, the button 164 and spring 166 are disposed within the seat 190 of the body 162 (see FIGS. 12A, B), such that the cylindrical member 214 of the button 164 extends through the bore 188 in the shelf 184. The spring 166 is retained between the shelf 184 and the top wall 206 of the button 164 and returns the button 164 to an unactuated position after the button 164 is depressed. As the button 164 is inserted within the seat 190, the ledge 210 of the button 164 passes over the tabs 192A, B disposed on the arc-shaped walls 178A, B and is retained thereunder. The combination of the tabs 192A, B and the ledge 210 prevent the button 164 from being removed from the body 162. When the button 164 is seated within the body 162, the lower end 212 of the annular sidewall 208 rests on the angled shelf portions 198A, B of the arms 196A, B.

The dispensing system may also include a use-up cue 216 (see FIG. 1), which is an indication to the user of the remaining useful life of the refill 102. A suitable use-up cue 216 may be one of the devices described in Adair et al. U.S. Pat. No. 7,892,487. As shown in FIG. 1, the use-up cue 216 is attached to the top annular support clip 112A. In alternative embodiments, the use-up cue 116 may be attached to other portions of the dispensing system 100. However, the use-up cue 216 should be retained within the interior 180 of the cover 106 when the dispensing system 100 is in a closed position so that the use-up cue's 116 exposure to the environment is the same as the exposure of the substrate 108. In other embodiments the use-up cue 216 is omitted.

FIGS. 11A-E show the operation of the dispensing system 100. Prior to use, the refill 102 is stored within a laminate or foil packaging (not shown) such that air cannot reach the refill 102 and the volatile is not dispensed. In the stored position, a band 218 extends around the refill 102 thereby retaining the refill 102 in a compressed state, which allows the refill to be easily stored. A user removes the refill 102 from the packaging and aligns the lower annular support clip 112B with the arms 130 of the base 104 (see FIG. 11A). When the refill 102 and the arms 130 are properly aligned, a force F is applied to the upper annular support clip 112A, thereby causing the lower annular support clip 112B to pass over the leader guide surfaces 142 onto the retaining surfaces 136. Thereafter, the pawls 140 snap over the upper surface 122 of the inner side wall 116A of the lower annular support clip 112B, thus attaching the refill 102 to the base 104 (see FIG. 12A). When the refill 102 is attached to the base 104, the user removes the band 218 by pulling a tab 220 (see FIGS. 11A and 11B). After the band 218 is removed, the spring 110 expands to allow the dispensing system 100 to be placed in the first operable position (see FIG. 11C).

In the operable position air is able to pass through the substrate 108, thereby allowing the volatile to be dispersed into the environment. Gaps 222 between the arms 130 of the base 104 and an opening 224 in the refill 102 allows air to reach and flow through an interior 226 of the refill 102, thereby providing additional dispersal of the volatile. The cylindrical shape of the refill 102 assists in the 360° dispersal of the volatile material around the dispensing system 100. The dispensing system 100 may rest on a support surface (not shown) or it may be hung using the hook 158 and string 156 as described above (see FIG. 7).

Figure 11C:
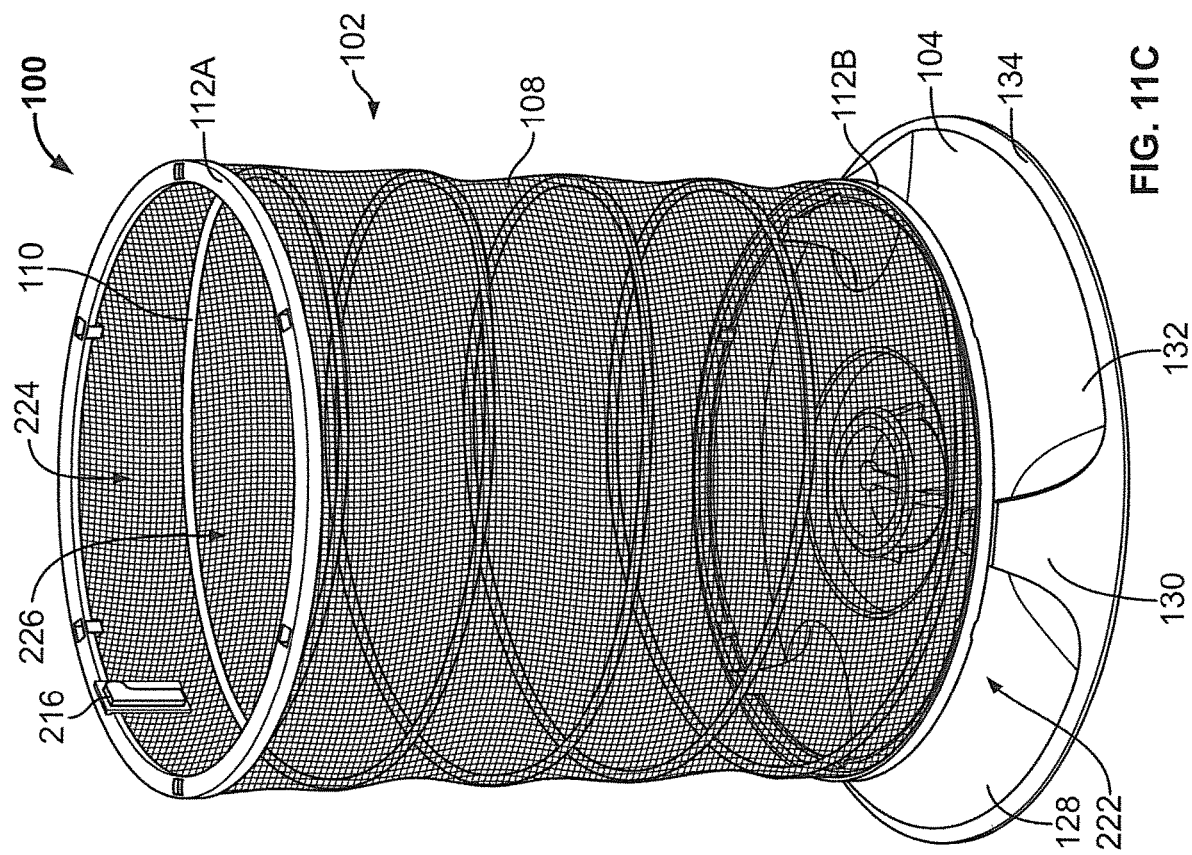
FIGS. 11A-E are isometric views of the dispensing system of FIG. 1 shown in various operational states.
Figure 11A:
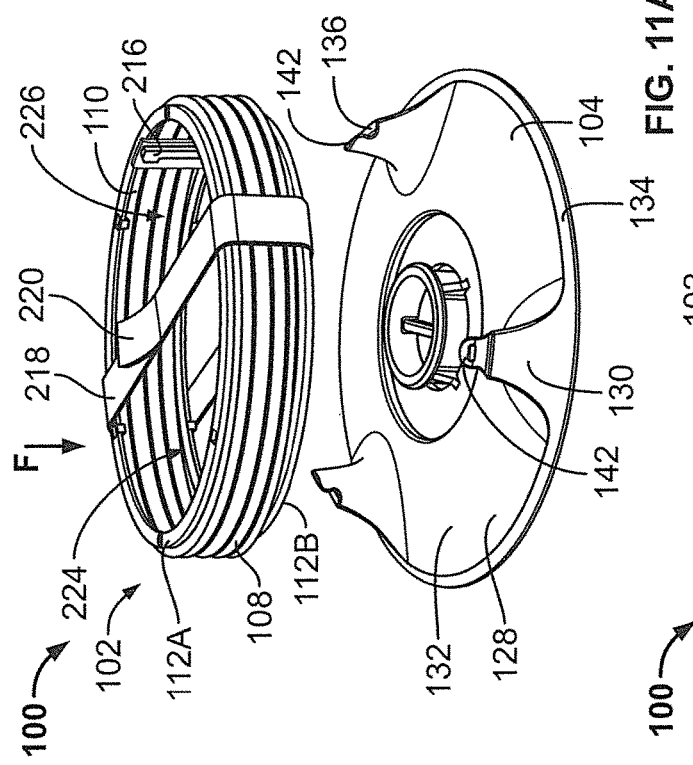
Figure 11B:
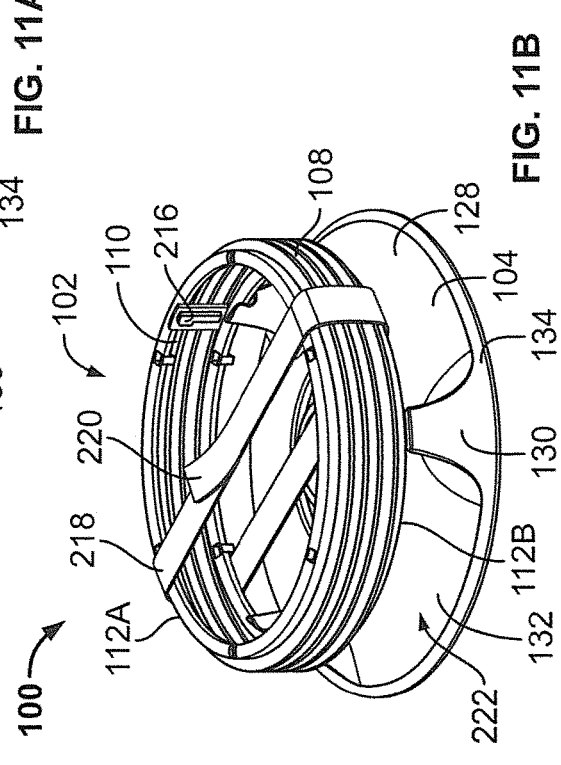
Figure 11D:
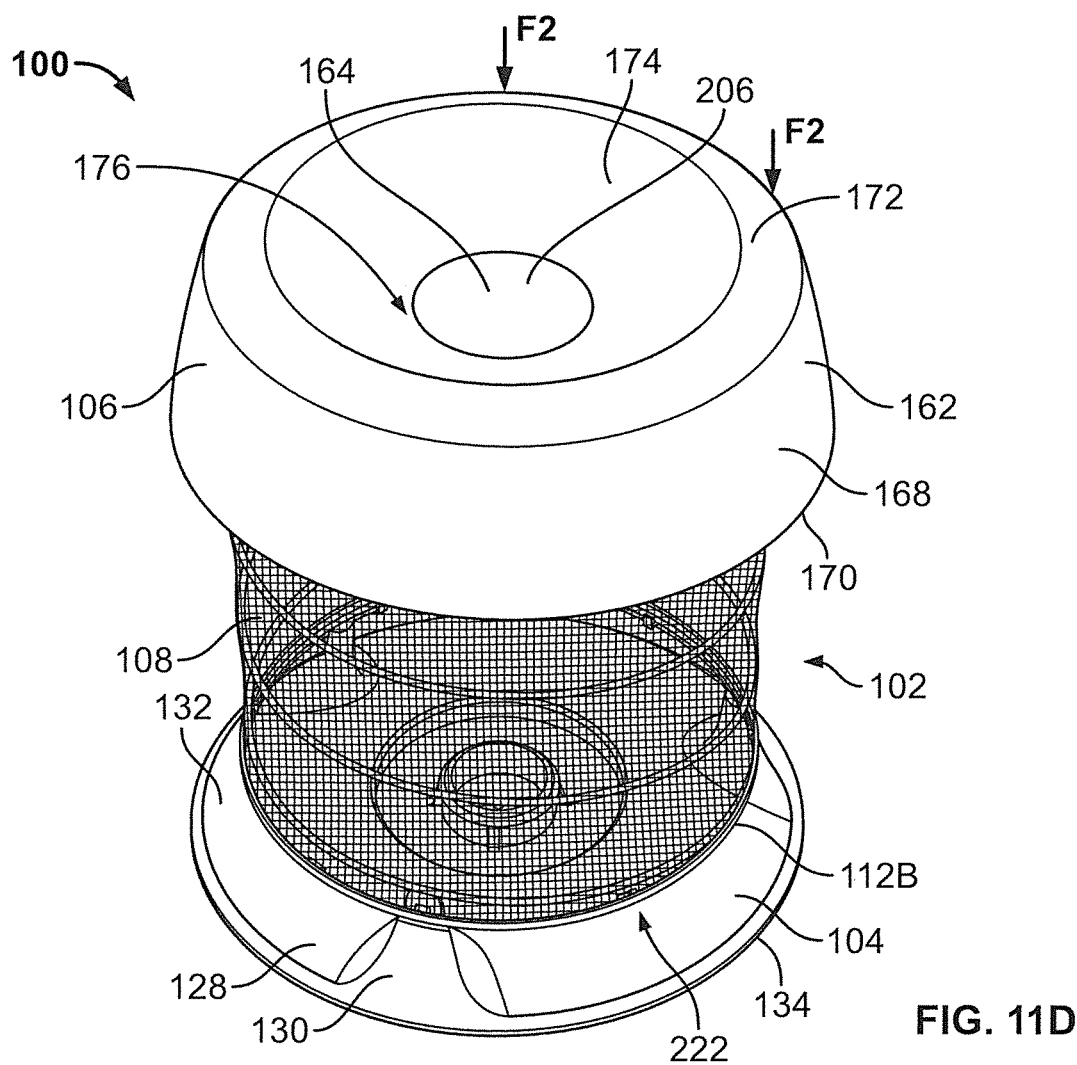
Figure 11E:
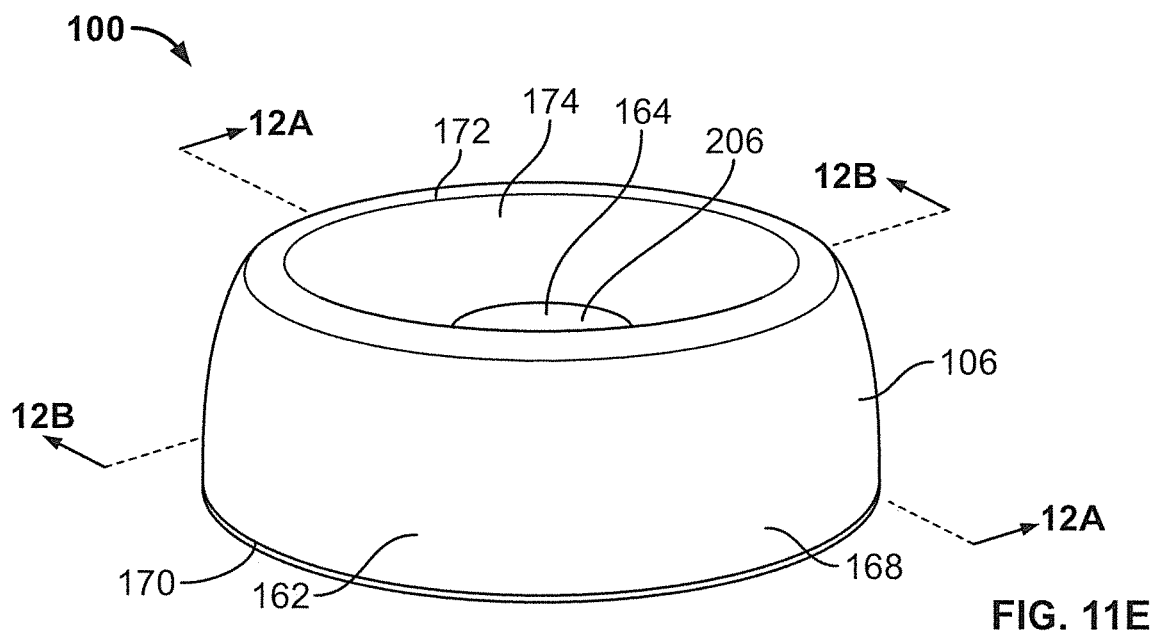

Referring now to FIGS. 11D and 11E, when dispersal of the volatile material is no longer desired the cover 106 is placed on the top annular support clip 112A such that the top annular support clip 112A is adjacent to the upper convex wall 172 of the body 162. As shown in FIG. 11D, after the cover 106 is placed on the top of the refill, a force F2 is applied to the cover 106, which causes the cover 106 to move downwardly toward the base 104. The downward movement of the cover 106 causes the top annular support clip 112A to move downwardly, thereby compressing the spring 110. As the cover 106 approaches the base 104, the opposing arms 196A, B contact the guide surface 150 of the annular ledge 146 of the base 104. Continued downward movement of the cover 106 causes the opposing arms 196A, B to ride along the guide surface 150 and deflect slightly outward, which allows the pawls 200A, B of the arms 196A, B to snap under the annular ledge 146 of the base 104, thereby locking the cover 106 to the base 104 (see FIGS. 12A and 12B).

In this position or state, the annular wall 204 depending from the top wall 206 of the body 162 of the cover 106 rests on the top surface 132 of the base 104 and acts as a stop to prevent the cover 106 from being pressed to far onto the base 104. In this locked position the lower end 170 of the sidewall 168 rests on the top surface 132 of the base 104, thereby sealing the refill 102 within the interior 180 of the body 162. When the refill 102 is sealed within the cover 106 the dispensing system 100 is in the second closed state, in which the volatile material is prevented (or substantially prevented) from being dispersed into the environment. In the second closed state the dispensing system 100 is also compact, which makes it easier to store when not in use.

Figure 12A:
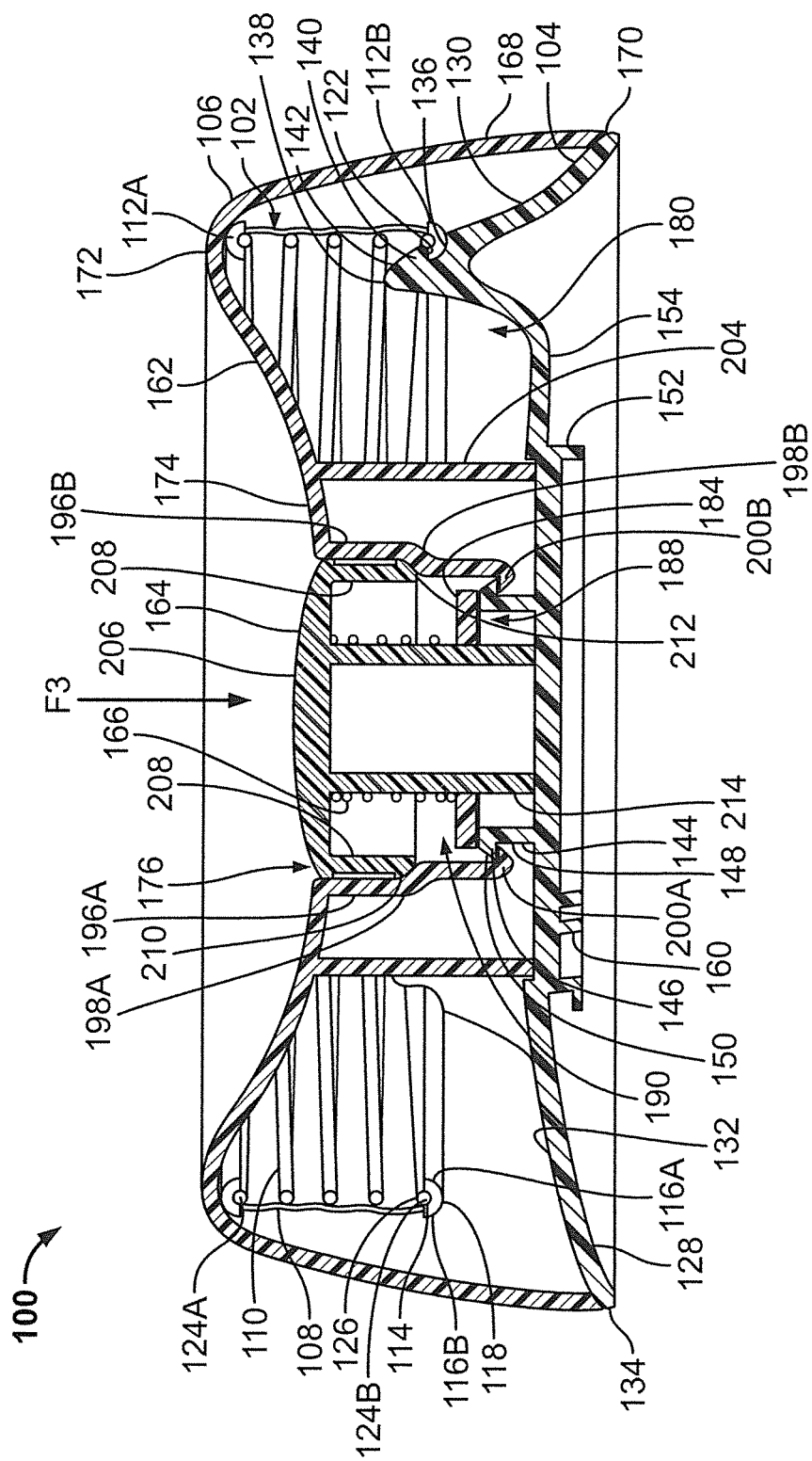
FIG. 12A is a cross-sectional view of the dispensing system taken along line 12A-12A of FIG. 11E.
Figure 12B:
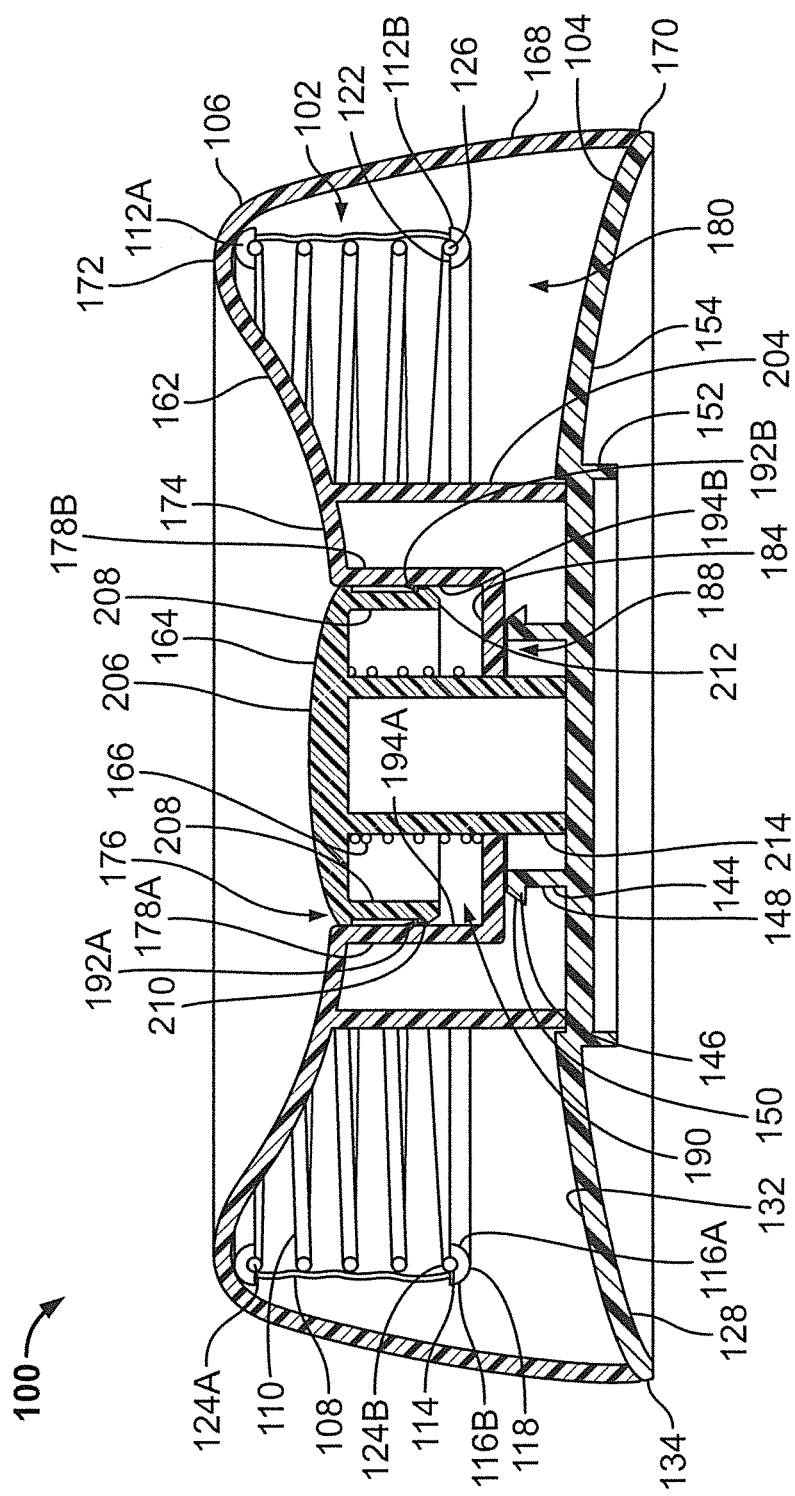
FIG. 12B is a cross-sectional view of the dispensing system taken along the line 12B-12B of FIG. 11E.

Still with reference to FIGS. 12A and 12B, when dispersal of the volatile material is again desired, a force F3 is applied to the button 164, thereby moving the button 164 downwardly within the cover 106. Downward movement of the button 164 causes the ledge 210 on the annular sidewall 208 to ride down the angled shelf portions 198A, B of the arms 196A, B. As the button 164 moves downwardly along the angled shelf portions 198A, B, the arms 196A, B deflect outwardly, thereby moving the pawls 200A, B out from beneath the annular ledge 146 of the base 104. Once the pawls 200A, B are removed from beneath the annular ledge 146, the cover 106 is unlocked and the user is able to remove the cover 106. After the cover 106 is removed the compressed spring 110 of the refill 102 automatically expands to assist in placing the dispensing system 100 in the first active state.

It is contemplated that in different embodiments, the dispensing system 100 may be any shape and/or size. For example, in the current embodiment the refill 102 is shown to comprise a circular cross-section, however, it is contemplated that the refill may have any shaped cross-section such as a rectangle, square, triangle, hexagon, or other geometric shape. The base and cover may be fashioned to correspond to the different shaped refills.

It is also envisioned that the refill 102 may be replaced after use, or, alternatively, the entire dispensing system 100 could be thrown away as a single use dispensing system 100.

Those skilled in the art will appreciate the numerous variations that may be made with respect to the present disclosure and which are intended to be captured herein.

All documents cited in the Detailed Description of the Invention are, in relevant part, incorporated herein by reference; the citation of any document is not to be construed as an admission that it is prior art with respect to the present invention.

INDUSTRIAL APPLICABILITY

Numerous modifications will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. A volatile material dispensing system, comprising:
a base including a plurality of arms;
a spring;
a refill including a substrate, a top support clip, and a bottom support clip, the top support clip and the bottom support clip each having an outer sidewall, an inner sidewall, a trough defined between the outer sidewall and the inner sidewall, and a pawl extending from an upper surface, wherein
 the refill is removably mountable to the plurality of arms in a first orientation via the top support clip, and
 the refill is removably mountable to the plurality of arms in a second orientation via the bottom support clip; and
a cover,
wherein the spring has a similar shape as an upper end of the substrate,
wherein the substrate is a semi-permeable material designed to carry a volatile material thereon,
wherein in an inactive state, the refill is compressed within the cover and the cover is attached to the base,
wherein in an active state, the cover is removed from the base and the refill, and the refill automatically expands such that an exterior portion of a lower portion of the refill extends from the plurality of arms of the base and the substrate is exposed to release the volatile material from the substrate and into an ambient environment, and
wherein in the second orientation, the refill is spaced above a top surface of the base by the plurality of arms such that gaps are formed between the plurality of arms, the base, and the bottom support clip.

2. The refill of claim 1, wherein the refill is cylindrically shaped.

3. The refill of claim 2, wherein the semi-permeable material comprises nylon.

4. The refill of claim 3, wherein the semi-permeable material has about 200 strands per centimeter.

5. The refill of claim 4, wherein the volatile material comprises an insecticide.

6. The refill of claim 2, wherein the top and bottom support clips are annular, and wherein a top end of the spring is retained within the top support clip and a bottom end of the spring is retained within the bottom support clip.

7. The refill of claim 6 further including a band, wherein the band extends around the refill and retains the refill in a compressed state prior to use.

8. The refill of claim 7, wherein removal of the band allows the spring to expand, thereby placing the refill in an operable position.

9. The refill of claim 8 further including a use-up cue.

10. The refill of claim 9, wherein the volatile material comprises an insecticide.

11. A volatile material dispensing system, comprising:
a base including a plurality of arms;
a spring;
a refill including a substrate having a volatile material thereon, a top support clip, and a bottom support clip, wherein
 the refill is removably mountable to the plurality of arms in a first orientation via the top support clip, and
 the refill is removably mountable to the plurality of arms in a second orientation via the bottom support clip; and
a cover,
wherein in an inactive state, the refill is compressed within the cover and the cover is attached to the base,
wherein in an active state, the cover is removed from the base and the refill, and the refill automatically expands such that an exterior portion of a lower portion of the refill extends from the plurality of arms of the base and the substrate is exposed to release the volatile material from the substrate and into an ambient environment,
wherein in the active state the exterior portion of the substrate substantially conforms in shape to the spring, and
wherein in the second orientation, the refill is spaced above a top surface of the base by the plurality of arms such that gaps are formed between the plurality of arms, the base, and the bottom support clip.

12. The volatile material dispensing system of claim 11, wherein the cover includes arms depending from a top wall thereof, and wherein in the inactive state the arms of the cover interact with the base to lock the cover to the base.

13. The volatile material dispensing system of claim 12, wherein the cover further includes a button for releasing the cover from the base, and wherein application of a force to the button causes the arms to deflect outwardly, thereby releasing the cover from the base.

14. The volatile material dispensing system of claim 11, wherein the refill includes the spring, wherein the spring is helical, and wherein the substrate is disposed around the spring.

15. The volatile material dispensing system of claim 14, wherein the substrate is cylindrically shaped and releases the volatile material into the ambient environment about 360 degrees of the substrate.

16. The volatile material dispensing system of claim 15, wherein the gaps allow air to flow through an opening in the refill.

17. The volatile material dispensing system of claim 16 further including a means for hanging the volatile material dispensing system.

18. The volatile material dispensing system of claim 16, wherein the volatile material is an insecticide.

19. The refill of claim 1, wherein a top end of the spring and the substrate are attached to the top support clip and a bottom end of the spring and the substrate are attached to the bottom support clip.

20. A method of placing a volatile material dispensing system into an operative position, comprising the steps of:
   providing a refill within a cover and a base, the base including a plurality of arms, wherein
      the refill includes a substrate disposed around a compressed spring, a top support clip, and a bottom support clip,
      the refill is removably mountable to the plurality of arms in a first orientation via the top support clip,
      the refill is removably mountable to the plurality of arms in a second orientation via the bottom support clip, wherein in the second orientation, the refill is spaced above a top surface of the base by the plurality of arms such that gaps are formed between the plurality of arms, the base, and the bottom support clip, and
   removing the cover from the base and the refill, whereby the compressed spring expands to automatically place the refill in an operable position, such that air passes through the gaps, through an interior of the refill, and around the substrate,
   wherein the substrate in the operable position substantially conforms in shape with the spring.

21. The method of claim 20, wherein the step of removing the cover includes the step of applying a force to a button located within the cover.

* * * * *